United States Patent [19]
Ostroff

[11] Patent Number: 5,401,483
[45] Date of Patent: Mar. 28, 1995

[54] CATALYST ASSEMBLY PROVIDING HIGH SURFACE AREA FOR NITRIC ACID AND/OR HCN SYNTHESIS

[75] Inventor: Craig B. Ostroff, Franklin Park, N.J.

[73] Assignee: Engelhard Corporation, Iselin, N.J.

[21] Appl. No.: 950,378

[22] Filed: Sep. 23, 1992

Related U.S. Application Data

[63] Continuation-in-part of Ser. No. 770,202, Oct. 2, 1991, abandoned.

[51] Int. Cl.$^6$ .......................... B01J 23/42; C01C 3/02; C01B 21/26; C01B 21/38
[52] U.S. Cl. ..................................... 423/376; 423/392; 423/403; 502/339; 502/439; 502/527
[58] Field of Search .................. 502/439, 527, 339; 423/403, 376, 392; 428/593, 603

[56] References Cited

U.S. PATENT DOCUMENTS

| | | |
|---|---|---|
| Re. 32,549 | 11/1987 | Bishop et al. . |
| 1,321,376 | 11/1919 | Jones et al. ................ 423/403 |
| 1,858,740 | 5/1932 | Jost . |
| 1,889,463 | 11/1932 | Cederberg . |
| 1,919,216 | 7/1933 | Handforth et al. . |
| 1,927,508 | 9/1933 | Titlestad et al. . |
| 1,927,963 | 9/1933 | Taylor . |
| 2,004,141 | 6/1935 | Tilley et al. . |
| 2,045,632 | 11/1934 | Colby . |
| 2,103,672 | 8/1935 | Heraeus . |
| 2,607,663 | 8/1952 | Perry et al. . |
| 2,866,692 | 12/1958 | Kautter et al. ................ 423/376 |
| 3,208,131 | 9/1965 | Ruff et al. . |
| 3,428,424 | 2/1969 | Keith ................ 423/403 |
| 3,660,024 | 5/1972 | Gillespie . |
| 3,915,898 | 10/1975 | Acres et al. . |
| 3,930,796 | 1/1976 | Haensel . |
| 3,931,051 | 1/1976 | Dubler . |
| 3,956,192 | 5/1976 | Nicolai . |
| 4,065,268 | 12/1977 | Betz . |
| 4,098,722 | 7/1978 | Cairns et al. . |
| 4,154,705 | 5/1979 | Baldi et al. . |
| 4,189,405 | 2/1980 | Knapton et al. . |
| 4,233,185 | 11/1980 | Knapton et al. . |
| 4,285,838 | 8/1981 | Ishida et al. . |
| 4,362,655 | 12/1982 | Jenkins . |
| 4,375,426 | 3/1983 | Knapton et al. . |
| 4,397,772 | 8/1983 | Noakes et al. . |
| 4,402,871 | 9/1983 | Retallick . |
| 4,672,809 | 6/1987 | Cornelison et al. . |
| 4,863,893 | 9/1989 | Farrauto et al. . |
| 4,869,891 | 9/1989 | Handley ................ 423/403 |
| 5,051,294 | 9/1991 | Lunkas et al. ................ 502/527 |
| 5,122,185 | 6/1992 | Hochella et al. . |
| 5,160,722 | 11/1992 | Hochella et al. ................ 423/403 |
| 5,316,997 | 5/1994 | Toyoda et al. ................ 502/527 |

OTHER PUBLICATIONS

"The Nitrogen Industry" Edited by G. D. Honti–Part I Akademiai Kiado–Budapest 1976, pp. 391, 394.
Statement on related art re: sale of corrugated recovery gauzes no date.

Primary Examiner—Wayne Langel

[57] ABSTRACT

A catalyst assembly is disclosed which comprises a plurality of foraminous wire mesh sheets disposed in intimate nested relation to each other along their broad surfaces, the wire sheets defining a non-planar cross-section which consists of a plurality of undulating corrugations. The border of the catalyst assembly is flattened to allow for secure installation in an ammonia converter. The invention includes individual sheets that are stacked adjacent each other, as well as pads comprising multiplicities of sheets that are edge bonded to each other to form integral units. The catalyst assemblies of the present invention provide a combination of increased surface area and reduced pressure drop that is unique and contributes to improve useful life and corresponding reductions in cost and down time. The catalyst assemblies may be easily manufactured and installed and may be prepared in a variety of sizes and shapes to suit the dimensions and requirements of differing reactors. The invention extends to methods of fabrication of the catalyst assemblies, as well as to methods of treating ammonia employing the assemblies.

18 Claims, 2 Drawing Sheets

CATALYST ASSEMBLY PROVIDING HIGH SURFACE AREA FOR NITRIC ACID AND/OR HCN SYNTHESIS

This is a continuation-in-part of application Ser. No. 07/770,202, filed on Oct. 2, 1991, abandoned.

BACKGROUND OF THE INVENTION

The present invention relates generally to catalyst bodies useful in industrial chemical processing, and particularly to catalysts that are useful in reactions such as the oxidative treatment of ammonia to synthesize nitric acid and/or its reduction to form hydrogen cyanide (HCN).

FIELD OF THE INVENTION

The processing of ammonia on an industrial scale to form the compounds $HNO_3$ and HCN is well-known and has been refined over many years. For example, U.S. Pat. No. 1,858,740 to Jost seeks to increase the yield during ammonia oxidation by the mechanical treatment of the platinum wire gauze that is used as the catalytic body. U.S. Pat. No. 1,919,216 to Handforth et al. notes that multiple layers of catalytic gauze have been used and seeks to address the difficulties that they observed as increased throughput, velocity and pressure are sought. The inventors noted that the catalytic body deteriorates and significant platinum losses by volatilization take place. The inventors seek to overcome this deficiency by thickening the catalyst bed to further break up the gas stream.

U.S. Pat. No. 1,927,963 to Taylor seeks to improve conversion efficiency by the substitution of wires of greater platinum content in alternating fashion into a wire mesh or gauze composed of a platinum-rhodium alloy. Also, U.S. Pat. No. 2,004,141 to Tilley et al. seeks to improve on the platinum alloy catalyst construction of prior U.S. Pat. No. 1,706,055 to Davis by placing a coating of pure platinum over the platinum alloy catalytic material. All of the above approaches reflect the diversity of activity that has been present in efforts to further improve the efficiency, throughput and yield of ammonia oxidation. The foregoing discussion is by no means exhaustive, as the prior art is replete with disclosures of modifications to every aspect of the process in efforts to achieve improved efficiencies and yields.

One of the central difficulties that are encountered in the oxidation of ammonia in an apparatus and with a process that uses a platinum-containing catalyst, has been the tendency of the reaction conditions to cause the volatilization of the catalyst, and by this, dramatic decreases in throughput and reaction yield. Such catchment devices as "getters" and the like have been developed and are in regular use for the purpose of recapturing the platinum for recycling and reuse. Representative of such efforts are U.S. Pat. No. 4,233,185 to Knapton et al., where a particular alloy was developed seeking to retain the platinum more securely to the gauze surface, and U.S. Pat. No. Re. 32,549 to Bishop et al., which proposes a particular catchment or "getter" assembly purported to have a greater useful life while at the same time efficiently recovering volatilized platinum.

One of the ways in which the prior art has sought to increase effectiveness of catalyst bodies in ammonia oxidation, has been with the fabrication and use of catalyst constructions with multiple layers. Likewise, the art does recognize that an increased catalyst surface area is desirable (see U.S. Pat. No. 4,869,891 to Handley for the illustration of multiple catalyst layers generally, and U.S. Pat. No. 2,045,632 to Colby for the preparation of catalyst bodies with increased surface area). Moreover, the art recognizes that, in the instance of multiple catalytic surfaces, the yield of desired reaction product increases with an increase in the number of catalyst gauzes and a corresponding decrease in the distance between each gauze (see "The Nitrogen Industry", Vol 1, C. D. Honti, ed., Akademia Kiado, Budapest, 1976 at page 394). While the art is replete with instances where catalysts are prepared with plural layers and individual catalyst layers are disposed with spaces between them (Colby, supra), there has been no motivation or suggestion that these concepts may somehow be embodied for the development of an improved catalyst structure All of the aforementioned techniques still fail to reduce the amount of precious metal volatilization that takes place during ammonia oxidation and that thereby limits the efficiency, durability and cost effectiveness of the process. Degradation of the catalytic gauze requires periodic replacement and corresponding down time, and the reliance upon getter devices, themselves of limited useful life, contributes both to down time and to increased costs in the recovery and recycling of the precious metal catalyst. All of the above carries with it concomitant limitations in efficiency of the reaction as there is a limit to the amount of catalyst that can be disposed in a given catalytic assembly. A need therefore exists for the development of a catalyst assembly that provides improved conversion efficiency in combination with reduced down time and corresponding loss of catalytic material.

SUMMARY OF THE INVENTION

In accordance with the present invention, a catalyst assembly is disclosed which is particularly useful in reactions such as that of the oxidative conversion of ammonia to nitric acid and/or the reduction of ammonia to form hydrogen cyanide, which comprises at least one and preferably a plurality of wire mesh sheets containing a catalytic metal, which wire mesh sheets have broad foraminous surfaces, the adjacent surfaces of said sheets being disposed in intermittent nested relation to each other. The broad surfaces of said sheets are nonplanar along the majority of their area and define a plurality of corrugations, so that an effective surface area of the resulting catalyst assembly is substantially increased from that of a corresponding planar catalyst assembly of the same outer perimeter dimension.

More particularly, the present catalyst assembly may comprise a plurality of wire mesh sheets or gauzes containing catalytic material such as platinum, alloys of platinum with rhodium, palladium and the like, and more preferably such alloys as contain in excess of 85% platinum. The number of sheets in the present catalyst assembly may vary, and as many as 20 or more sheets may be corrugated and nested together. Each of the sheets is disposed in intimate nested relation to the next adjacent sheet with corresponding corrugations that may preferably be regularly spaced so as to assure such uniform and intimate nesting relation.

The catalyst assembly may be prepared with multiple sheets that are stacked and optionally bound together along their perimeters or borders so as to define a unitary structure that offers the advantages of ease of handling and installation. The preparation of the present catalyst assembly comprises the provision of the individual sheets or gauzes, which in a first embodiment may be individually crimped to form the non-planar corrugated surface, edge trimmed and flattened and thereafter stacked; or alternately, may be stacked and then subjected to the action of crimping, trimming and edge flattening. Thus, subsequent to crimping, the resulting sheets may be trimmed along their perimeter and then the outer border of the sheets may be flattened in the instance of individual sheets or flattened and then bound in the instance of multiple stacked sheets, by the application of heat and/or pressure. For example, hot pressing or dapping with the use of a flame torch may be performed so that a flat border of the resulting assembly is defined. The border is preferably prepared to a width equal to or slightly greater than that of the hold down rings found in the conventional reactor. In this way, a secure seating of the catalyst assembly within the reactor is assured, and bypass of the gas stream is prevented.

The present catalyst assembly also includes a support screen which preferably bears the same broad surface corrugations as that of the assembly itself. Also, the assembly may be provided with coatings or additional sheets that are particularly designed to assist in the start-up of the oxidative process also known as "light-off." For example, a coating useful for assisting in the light-off of the catalyst assembly of the present invention is found in commonly assigned U.S. Pat. No. 4,863,893 to Farrauto et al., the disclosure of which is incorporated herein by reference for its teachings of such coatings, methods for their preparation and use in ammonia oxidation processes. The preferred coating is a high surface area coating (in excess of 50 cm$^2$/g) of platinum typically prepared by electrostatic spraying of thermally decomposable platinum precursors, then thermally decomposing these precursors. In a preferred embodiment, one or more layers of the wire mesh sheets or gauzes containing catalytic materials is coated with a light-off assisting material. Preferably, the coated layers of such catalytic mesh are located on the upstream side of the present catalyst assembly when said assembly is located in an ammonia oxidation reactor.

The catalyst assembly of the present invention is believed to possess many advantages, among them increased effective surface area in combination with reduced oxygen partial pressure at a differential gauze surface. The combination of these capabilities would be unexpected, as lower oxygen partial pressures are not obtained simply by the increase of effective surface area. Specifically, one of the primary factors underlying the present invention is the perception that the pressure drop of a corrugated or crimped sheet of catalyst material such as that prepared in accordance herewith, is less than that of a flat sheet of catalyst material of the same size. Further, the present catalyst assembly offers increased useful life, rate of conversion, and resulting throughput while offering reduced pressure drop and burn-off rate of the catalytic material, the last mentioned particularly critical to the extension of the useful life of the catalyst assembly and concomitant down time and catalytic material recycling costs and time.

The modular construction of the present catalyst assembly promotes ease of installation and removal as it may be shipped, installed and removed as a unit. Because of the extended surface area and reduced pressure drop of the present assembly, fewer sheets or gauzes may be included, and a reduction of as much as 30% or more of actual catalytic material in a particular catalyst assembly, while achieving a comparable throughput and percentage of conversion, is possible.

Accordingly, it is a principal object of the present invention to provide a catalyst assembly that offers improved catalytic activity with reduced cost and down time.

It is a further object of the present invention to provide a catalyst assembly as aforesaid that is easily fabricated and installed.

It is a still further object of the present invention to provide a catalyst assembly as aforesaid that requires less catalytic material while achieving a comparable performance to that of prior art catalytic materials, all over an extended useful life.

It is a still further object of the present invention to provide a catalyst assembly as aforesaid that may be easily installed and retrofitted into existing oxidation reactors without modification thereto.

It is a still further object of the present invention to provide a method for the fabrication of a catalyst assembly which is easily and inexpensively performed.

Other objects and advantages will become apparent to those skilled in the art from a review of the ensuing detailed description which proceeds with reference to the following illustrative drawings.

DETAILED DESCRIPTION

In its primary aspect, the present invention concerns the fabrication and use of a catalyst assembly particularly suited for oxidative reactions and, more particularly, to be used in the oxidation of ammonia to form nitric acid and the reduction of ammonia to form hydrogen cyanide. In the conventional production of nitric acid from ammonia, a mixture of ammonia and air in suitable proportions is passed through a catalytic structure, frequently a gauze, which serves as a catalyst for the oxidative conversion of the ammonia to nitric oxide. The effluent gas from the gauze is cooled and further treated with additional air and water to produce nitric acid. In such instance, the gauze or catalytic body is usually prepared from platinum or a platinum-based alloy, and more frequently comprises platinum with a quantity of rhodium. Such a gauze is usually woven and, for example, may be prepared from wire of 0.003" diameter having 80 meshes to the linear inch. Such gauzes are fabricated by the preparation of wire from large platinum alloy ingots followed by the weaving of such wire into gauzes. As can be appreciated, the preparation of wire gauzes of this type is costly and time-consuming, and it is therefore desirable to maximize their useful life. In the present invention, as described earlier and as illustrated in connection with the above figures, wherein like numerals designate like parts, a catalyst assembly is disclosed which comprises at least one and preferably a plurality of such wire mesh or gauze sheets, which sheets have broad foraminous surfaces, the foraminous surfaces being in intimate nested relation to each other and defining a non-planar configuration over the majority of their area by a plurality of corrugations. The catalyst assembly of the present invention is schematically illustrated as installed in an ammonia reactor in FIG. 1.

Figure 1:
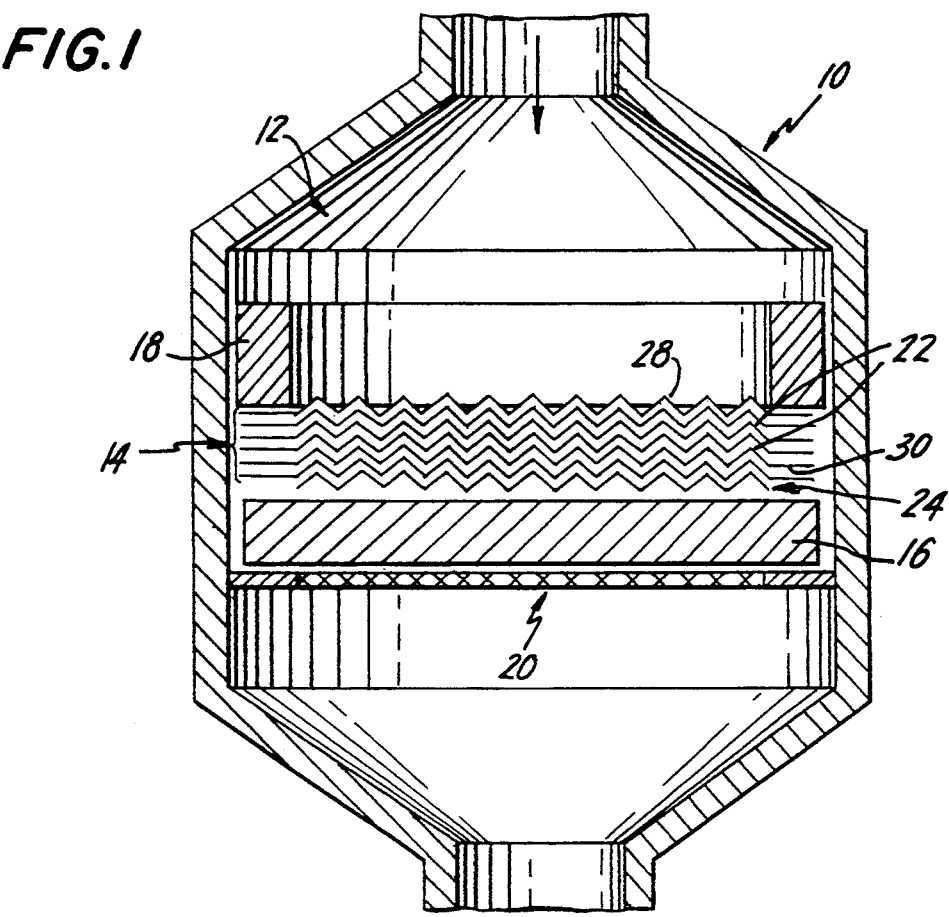
FIG. 1 is a schematic sectional view of an ammonia reactor containing the catalyst assembly of the present invention.

Accordingly, and with reference to FIG. 1, an ammonia reactor or converter housing 10 is schematically shown which defines an inner chamber 12 for the flow through of the ammonia and air as described above. Chamber 12, in turn, houses the conversion catalyst including the present catalyst assembly 14. Catalyst assembly 14 is illustrated as comprising a series of nested wire sheets 22 defining along the broad surfaces thereof a series of corrugations 28 and a border 30 that is essentially flattened. Catalyst assembly 14, as illustrated, rests on top of a getter or recovery gauze 16, which, in turn, is supported by a base metal support grid illustrated generally at 20. Catalyst assembly 14 is maintained in position against getter gauze 16 by a hold down ring 18 resting on the outer perimeter or border 30 of the uppermost sheet 22. Thus, incoming reactants first contact the catalyst assembly 14 and thereafter pass through the getter gauze 16 and support grid 20 after which they are routed for further processing into the final reaction products.

Figure 2:
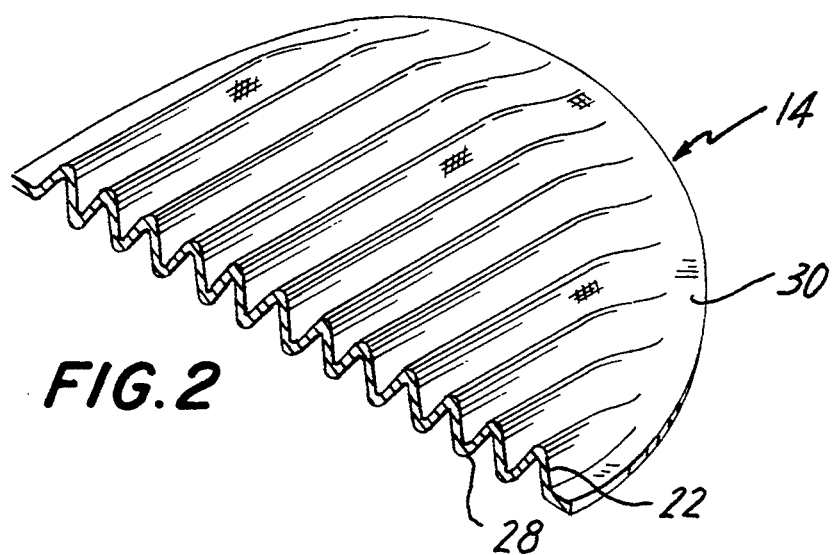
FIG. 2 is a perspective sectional view illustrating the catalyst assembly in accordance with the present invention.

Referring further and with reference to FIG. 2, wire mesh sheets 22 bear corrugations 28 which, in a preferred embodiment, are regularly spaced rolls or undulations sized to achieve a final effective surface area of assembly 14 of at least about 1.6 and, typically, that may be from 1.6 to 1.7 times that of a conventional flat catalyst gauze. The outer perimeter or border 30 represents a flattened rim wherein the respective sheets 22 are bound to each other. The flattened rim likewise facilitates the secure seating of assembly 14 beneath hold down ring 18 as shown in FIG. 1 and thereby avoids unwanted bypass and correspondingly undesirable side reactions that may result in the formation of unwanted byproducts during the reaction. In practice, the flattened perimeter or border 30 may extend from 0.5" to about 2" in width, to accommodate variations in hold down ring size. Naturally, this dimension is provided for purposes of example only, as variations may exist depending upon the size of the apparatus into which the present catalyst assembly may be installed.

Likewise, and by way of example only, the individual sheets 22 of catalyst assembly 14 may be prepared from wire gauze having a wire diameter ranging from about 0.0025" to about 0.09", with gauze mesh ranging from about 20 to about 90 or more wires per inch. The assembly may comprise individual sheets having the corresponding corrugations and adaptability for nesting, as illustrated herein, or can be prepared as a unit or pad of a multiplicity of such sheets bound to each other at the outer border. Thus, the more general schematic representation of the invention shown in FIG. 1 contemplates individual sheets having the complementary cross-sectional configurations illustrated that offer the intimate contiguous surface contact that is a feature of the present invention, while the assembly illustrated in FIG. 2 contemplates the preparation of a pad comprising multiple wire sheets bound together.

The wire sheets or gauzes may be prepared from known catalytic alloy compositions known in the art. In the instance where the catalyst assembly is to be used for the oxidative conversion of ammonia, a preferred composition comprises platinum, and more particularly, an alloy containing platinum as its majority element. Other platinum alloys useful in the present invention include alloys of platinum with rhodium, and alloys of platinum, rhodium and palladium. Numerous alloys of platinum for use in the manufacture of catalyst gauzes are known in the art, and the practice of the present invention is not limited to the selection of a particular alloy composition.

In the instance where alloys containing both platinum and rhodium are employed in the oxidation of ammonia to nitric acid, a problem that has been experienced by the art comprises the formation of excessive amounts of rhodium oxide. One of the perceived advantages of the present invention is that the assembly described herein will promote reduced rhodium oxide formation and the economies in operation that will follow as a consequence.

Referring further to FIG. 1, the catalyst assembly of the present invention includes a support screen 24 that is disposed immediately downstream and in contact with assembly 14, as shown. The support screen is generally prepared from a variety of base metals as it must provide sufficient strength and rigidity to maintain the position of the catalyst in use. Accordingly, the support screen may be prepared from a variety of known compositions, such as that sold under the trademark FECRALLOY and which comprises from 10 to 30% chromium, 1 to 10% aluminum, 0 to 0.5% carbon and the balance iron. A particular composition may comprise 5% aluminum, 21% chromium, balance iron. Alternative alloys sold under the trademarks KANTHAL or MEGAPYR comprise inconel/nichrome alloys. Alternative alloy combinations include nichrome alone and stainless steel.

Figure 4:
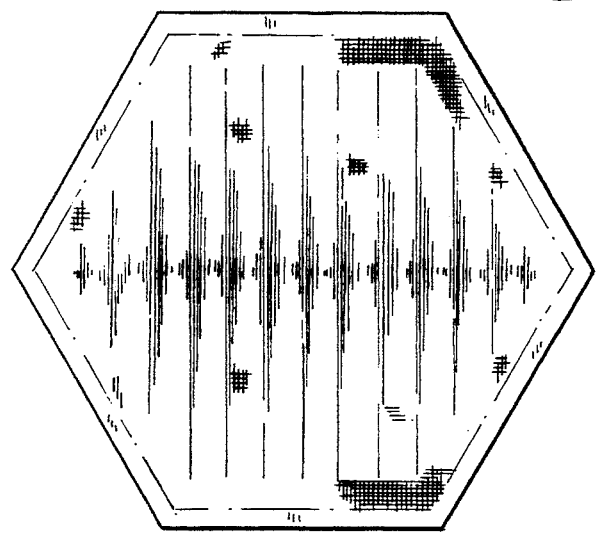
FIGS. 3 and 4 are plan views illustrating, respectively, catalyst assemblies of the present invention prepared with circular and hexagonal perimeters.
Figure 3:
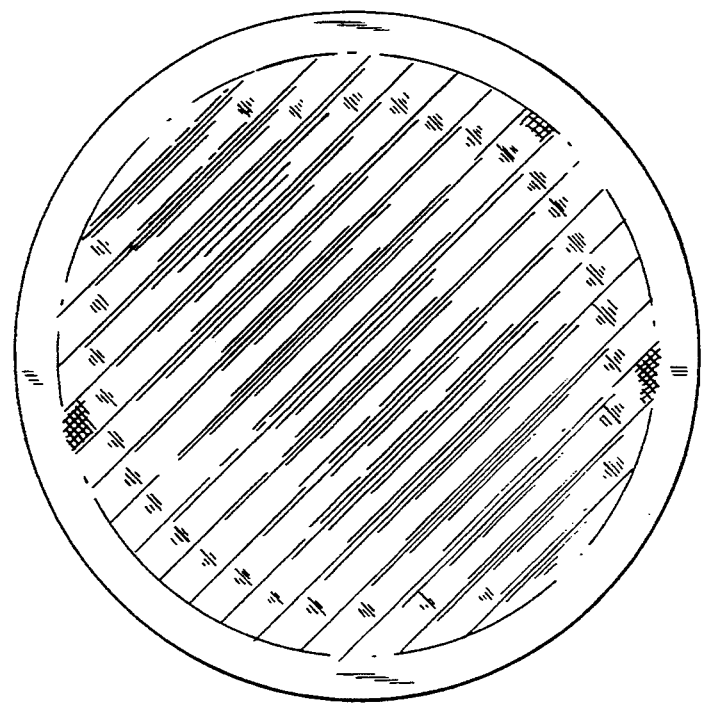

Referring now to FIGS. 3 and 4, herein are illustrated differing shapes in which the present catalyst assembly may be prepared. Accordingly, in FIG. 3, an essentially circular outer perimeter is depicted, while in FIG. 4, an essentially hexagonal shape is shown. These shapes are merely representative, as the catalyst assembly can be prepared with any perimeter that may be desired, and that depends upon the internal shape of the converter into which the catalyst is to be placed.

The preparation of the present catalyst assembly comprises the crimping of the individual sheets or gauzes to form the general corrugations as illustrated, followed by the flattening of the outer perimeter or border of the sheets, and in a particular embodiment, the bonding of multiple sheets to each other at the border. Thus, a foraminous metal sheet containing catalytic material, such as gauze 22, is provided in flat form, having an area roughly greater than two times that of the area that would be possessed by a flat sheet or gauze having an outer perimeter or border of comparable dimension. The sheet may then be placed in a crimping machine having two interlocking corrugated rolls and subjected to a crimping or corrugating action to form the rippled outer surface appearance as best shown in FIG. 2.

Following the imposition of the corrugations, the crimped sheets may be cut to define outer perimeters corresponding in size to the internal diameter of the reactor into which they will be placed, after which the sheets may be flattened along their borders as by the application of hot pressing or dapping with a flame torch. The borders so flattened will, as indicated earlier, have a size that may range up to 2", and that corresponds to the size of the hold down ring to be placed on top of the catalyst assembly on installation. In the instance where multiple sheets are being prepared as a pad, the flattening step may be performed with multiple sheets already in nested relation, so that the application of heat and pressure will bond the borders of the respective adjacent sheets to each other to form the final pad or unit.

Accordingly, a further aspect of the invention comprises a method for the fabrication of a catalyst assembly offering increased surface area and reduced pressure drop comprising:
- (a) preparing at least one foraminous catalytic metal sheet, which sheet has an area greater than that of a planar sheet of a perimeter corresponding in size to the final perimeter of said catalyst assembly;
- (b) corrugating the catalytic metal sheet to define a non-planar broad surface;
- (c) cutting the sheet of step (b) to the size of the final perimeter of said assembly; and
- (d) flattening the outer perimeter of the cut sheet of step (c).

Figure 5:
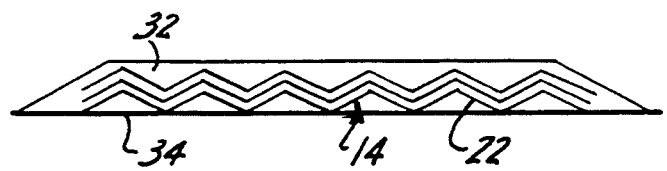
FIG. 5 is a side sectional view illustrating a catalyst assembly in accordance with an alternate embodiment of the present invention.

In a further alternate embodiment of the present invention, the catalyst assembly may be prepared as unit as indicated, with flat outer gauze sheets forming an enclosure, as illustrated in FIG. 5. Thus, assembly 14 is shown encased within an upper sheet 32 and a corresponding lower sheet 34 that may comprise gauzes of similar composition to that of the individual sheets 22 of the assembly. In this embodiment, the outer sheets 32 and 34 may be coated with a composition that enhances the start-up of oxidation processes. The preparation of this composite construction as shown is optional, as is the application to the outer sheets of the above-noted coating. Preferably, however, the compositions that enhance the start-up of oxidation processes (light-off) are coated on one or more of sheets 22; typically, of the sheets in the catalyst assembly are coated beginning with the uppermost sheet and successively coated up to about 50% of the sheets in the catalyst assembly from about 25% up to about 40% of such sheets. Furthermore, the coating of light-off enhancing material may be applied before or after crimping, although coating prior to crimping is preferred.

Yet further, the invention extends to a method for processing ammonia to form either nitric acid or hydrogen cyanide, by passing ammonia preferably in gaseous form through a reactor containing a catalyst therein, wherein the catalyst comprises the present catalyst assembly.

The present invention will be better understood from a consideration of the following illustrative Example.

EXAMPLE A

A catalyst assembly was prepared having three plys of a wire gauze prepared from a composition comprising 90% platinum, 5% palladium and 5% rhodium. The outer shape of the pad was hexagonal and bore a rough diameter or size of 16" including a 1" border of flattened material, leaving 14" of "effective size" of corrugated material. The catalyst assembly possessed a weight of 1.68 troy ounces per square foot and may thus be compared with a standard flat pad of comparable ply that would weigh 7.76 troy ounces while providing a surface area of 4.619 square feet. The inventive catalyst assembly weighed 13.055 troy ounces and offers a surface area of 7.771 square feet.

EXAMPLE B

The catalyst gauze assembly is prepared in accordance with the following:

Five flat rectangular catalyst gauze sheets of 90% platinum, 5% rhodium and 5% palladium with 80 wires per inch and 0.0031 inch diameter measuring 76"×50" are cleaned in an ultrasonic bath and washed with deionized water, then dried in the air. Two coats of high-surface area platinum precursor are applied to both sides of each catalyst gauze sheet by electrostatically spraying aqueous chloroplatinic acid admixture with 5% platinum by weight onto the cleaned gauze. After both coats of precursor are applied, the gauze is slowly heated to, then held for 30 minutes at 450° C. thereby decomposing the precursor to yield a high-surface area platinum coating. These five platinum treated catalyst gauze sheets are stacked one on top of the other and corrugated to obtain a peak distance of about 1.2 cm. and a corrugation depth of about 1 cm. using a crimping machine having two interlocking corrugated rolls. The foregoing corrugation step is repeated to produce two five-sheet sets of corrugated catalyst gauze using untreated catalyst gauze sheets of the same specifications used to prepare the treated gauze. These three sets (one treated and two untreated) of corrugated gauze are nested upon each other so that the platinum treated gauze is on top, then centered and nested upon an iron-chromium-aluminum alloy base metal support screen which is 43" in diameter and crimped in the same fashion as the catalyst gauze. A 1" border of the resulting 15 ply catalyst gauze material is smoothed and flattened at the perimeter of the base metal screen using a torch and a hammer to form the border, carefully avoiding damage to the corrugations within the circle formed by the base metal screen.

The resulting catalyst assembly can then be placed in a commercial scale ammonia converter so that the side of the assembly treated with high surface area platinum faces toward the ammonia gas flow.

Installation of the inventive catalyst assembly in a commercial scale ammonia converter is anticipated to achieve improved throughput, useful life and product yield in combination with reduced pressure drop and platinum burn-off.

While there have been herein shown and described the preferred embodiments of the present invention, it will be understood that the present invention may be embodied otherwise as herein specifically illustrated or described, and that within such embodiment certain changes in the detail and construction, and the form and arrangement of the parts may be made without departing from the underlying idea or principles of the invention within the scope of the appended claims.

What is claimed is:

1. A catalyst assembly for use in the oxidation of ammonia comprising:
    a plurality of wire mesh sheets containing a catalytic metal having broad foraminous surfaces, the adjacent foraminous surfaces of said sheets being in intimate nested relation to each other,
    said surfaces being non-planar along the majority of their area and defining a plurality of corrugations; wherein said catalyst assembly provides increased catalytic surface area with lower pressure drop.

2. The catalyst assembly of claim 1 wherein each of said sheets defines a flat outer perimeter.

3. The catalyst assembly of claim 1 wherein said sheets are bound to each other along the outer perimeters thereof, and said outer perimeters are substantially flat.

4. The catalyst assembly of claim 3 wherein said sheets are bound together along said outer perimeters by application of heat and/or pressure.

5. The catalyst assembly of claim 1 wherein said corrugations are regularly spaced.

6. The catalyst assembly of claim 1 wherein said wire mesh sheets comprise woven metallic gauze.

7. The catalyst assembly of claim 6 wherein said wire mesh sheets are prepared from a material selected from the group consisting of platinum and alloys thereof.

8. The catalyst assembly of claim 7 wherein said wire mesh sheets comprise at least 85% platinum.

9. The catalyst assembly of claim 7 wherein said wire mesh sheets are prepared from an alloy of platinum, rhodium, and optionally palladium.

10. The catalyst assembly of claim 1 further including a catalyst support screen, said support screen having a non-planar surface corresponding in shape to that of said wire mesh sheets and positioned downstream of said sheets.

11. The catalyst assembly of claim 1 wherein all of said sheets are disposed as a unit between two essentially planar outer wire mesh sheets.

12. A catalyst assembly according to claim 1 wherein one or more of said sheets are provided with coatings which assist in the start-up of the oxidation of ammonia.

13. A catalyst assembly according to claim 12 wherein up to 50% of said sheets are successively coated with said coating beginning with the upper most sheet containing catalytic metal in said assembly.

14. A catalyst assembly for use in the oxidation of ammonia comprising:
   a plurality of wire mesh sheets containing a catalytic metal having broad foraminous surfaces, the adjacent foraminous surfaces of said sheets being in intimate nested relation to each other,
   said surfaces being non-planar along the majority of their area and defining a plurality of corrugations;
   wherein the surface area of said catalyst assembly is about 1.6 to about 1.7 times that of planar catalyst gauze assemblies of the same outer perimeter;
   wherein said catalyst assembly provides increased catalytic surface area with lower pressure drop.

15. In a method for the reaction of ammonia to form a reaction byproduct selected from the group consisting of nitric acid and hydrogen cyanide comprising the passage of said ammonia through a reactor containing a catalyst for the conversion of said ammonia to said byproduct, the improvement comprising the passage of said ammonia through a catalyst assembly, said catalyst assembly comprising:
   a plurality of wire mesh sheets containing a catalytic metal having broad foraminous surfaces, the adjacent foraminous surfaces of said sheets being in intimate nested relation to each other,
   said surfaces being non-planar along the majority of their area and defining a plurality of corrugations;
   wherein said catalyst assembly provides increased catalytic surface area with lower pressure drop.

16. The method of claim 15 wherein each of said sheets defines a flat outer perimeter.

17. The method of claim 15 wherein said sheets are bound to each other along the outer perimeter thereof, and said outer perimeters are substantially flat.

18. In a method for the reaction of ammonia to form a reaction by-product selected from the group consisting of nitric acid and hydrogen cyanide comprising the passage of said ammonia through a reactor containing a catalyst for the conversion of said ammonia to said by-product, the improvement comprising the passage of said ammonia through a catalyst assembly, said catalyst assembly comprising:
   a plurality of wire mesh sheets containing a catalytic metal having broad foraminous surfaces, the adjacent foraminous surfaces of said sheets being in intimate nested relation to each other,
   said surfaces being non-planar along the majority of their area and defining a plurality of corrugations;
   wherein one or more of said sheets are provided with coatings which assist in the start-up of the oxidation of ammonia;
   wherein said catalyst assembly provides increased catalytic surface area with lower pressure drop.

* * * * *